(12) United States Patent
Cram et al.

(10) Patent No.: US 7,657,582 B1
(45) Date of Patent: Feb. 2, 2010

(54) USING RECENT ACTIVITY INFORMATION TO SELECT BACKUP VERSIONS OF STORAGE OBJECTS FOR RESTORATION

(75) Inventors: Paul Cram, San Luis Obispo, CA (US); Stephen Andrew Breidbach, Atascadero, CA (US); Anthony T. Orling, San Luis Obispo, CA (US); Brian Greene, Arroyo Grande, CA (US)

(73) Assignee: Symantec Operating Corporation, Mountain View, CA (US)

( * ) Notice: Subject to any disclaimer, the term of this patent is extended or adjusted under 35 U.S.C. 154(b) by 214 days.

(21) Appl. No.: 11/197,694

(22) Filed: Aug. 4, 2005

Related U.S. Application Data

(60) Provisional application No. 60/674,224, filed on Apr. 22, 2005.

(51) Int. Cl.
 *G06F 12/00* (2006.01)
(52) U.S. Cl. .................... 707/204; 707/3; 707/200; 711/162; 714/5
(58) Field of Classification Search ............ None
 See application file for complete search history.

(56) References Cited

U.S. PATENT DOCUMENTS

| | | | | |
|---|---|---|---|---|
| 5,559,991 | A * | 9/1996 | Kanfi ...................... | 711/162 |
| 5,642,505 | A * | 6/1997 | Fushimi .................. | 707/204 |
| 5,701,480 | A * | 12/1997 | Raz ......................... | 718/101 |
| 5,764,877 | A * | 6/1998 | Lomet et al. ............. | 714/6 |
| 5,778,387 | A * | 7/1998 | Wilkerson et al. ....... | 707/202 |
| 5,829,023 | A * | 10/1998 | Bishop .................... | 711/118 |
| 5,946,699 | A * | 8/1999 | Sawashima et al. ...... | 707/203 |
| 6,289,460 | B1 * | 9/2001 | Hajmiragha .............. | 726/28 |
| 6,321,231 | B1 * | 11/2001 | Jebens et al. ............. | 707/104.1 |
| 6,625,624 | B1 * | 9/2003 | Chen et al. .............. | 707/204 |
| 6,658,436 | B2 * | 12/2003 | Oshinsky et al. ........ | 707/204 |
| 6,917,948 | B2 * | 7/2005 | Campbell ................ | 707/104.1 |
| 7,287,048 | B2 * | 10/2007 | Bourbonnais et al. .... | 707/204 |
| 7,379,949 | B2 * | 5/2008 | Chowdhury .............. | 707/103 R |
| 2001/0002204 | A1 * | 5/2001 | Jebens et al. ............. | 375/240.01 |

(Continued)

OTHER PUBLICATIONS

"Enterprise Rewinder Product Suite," Datasheet, XoSoft, Inc., 2004.*

(Continued)

*Primary Examiner*—Hung Q Pham
*Assistant Examiner*—Hubert Cheung
(74) *Attorney, Agent, or Firm*—Meyertons, Hood, Kivlin, Kowert & Goetzel, P.C.; B. Noel Kivlin

(57) ABSTRACT

A system for using recent activity information to select backup versions of storage objects for restoration comprises a processor and memory coupled to the processor, where the memory stores program instructions computer-executable by the processor to implement a backup manager. The backup manager is configured to maintain one or more backup versions of a plurality of storage objects and a plurality of access history records, where each access history record is associated with a particular backup version. Each access history record includes information indicative of an access to the corresponding storage object by a user. The backup manager may be configured to select a particular backup version as a restoration candidate using at least the contents of the access history record associated with the backup version.

19 Claims, 8 Drawing Sheets

U.S. PATENT DOCUMENTS

2001/0047368 A1* 11/2001 Oshinsky et al. ............. 707/204
2003/0163449 A1* 8/2003 Iwano et al. .................... 707/1
2004/0128316 A1* 7/2004 Campbell ................ 707/104.1
2004/0167942 A1* 8/2004 Oshinsky et al. ............. 707/204
2005/0149584 A1* 7/2005 Bourbonnais et al. ....... 707/204
2006/0004850 A1* 1/2006 Chowdhury ............ 707/103 R

OTHER PUBLICATIONS

"Enterprise RewinderTM Product Suite"; Datasheet; Xosoft, Inc.; Waltham, MA; 2004.

"TimeData: File-Based Continuous Data Protection Software"; Datasheet; TimeSpring Software, 2005.

* cited by examiner

USING RECENT ACTIVITY INFORMATION TO SELECT BACKUP VERSIONS OF STORAGE OBJECTS FOR RESTORATION

This application claims the benefit of U.S. provisional patent application Ser. No. 60/674,224, entitled "Advanced Techniques For Data Protection And Restoration", filed Apr. 22, 2005.

BACKGROUND OF THE INVENTION

1. Field of the Invention

This invention relates to computer systems and, more particularly, to backup and restoration of data within computer systems.

2. Description of the Related Art

Many business organizations and governmental entities rely upon applications that access large amounts of data, often exceeding many terabytes of data, for mission-critical applications. Numerous different types of storage devices, potentially from multiple storage vendors, with varying functionality, performance and availability characteristics, may be employed in such environments.

Any one of a variety of failures, such as system crashes, hardware storage device failures, software defects, and user errors such as inadvertent deletions of files, may potentially lead to data corruption or to a loss of critical data in such environments. In order to recover from such failures, various kinds of backup techniques may be employed. Traditionally, for example, backup images of critical data may have been created periodically (e.g., once a day) and stored on tape devices. However, a single backup version of production data may not be sufficient to meet the availability requirements of modern mission-critical applications. For example, for disaster recovery, it may be advisable to back up the data of a production application at a remote site, but in order to be able to quickly restore the data in the event of a system crash or other error unrelated to a large-scale disaster, it may be advisable to store a backup version near the production system. In addition, in many environments, users may wish to restore a storage object to its state as of a particular point in time (e.g., the version of a file that was modified yesterday may need to be restored). As a consequence, in some storage environments, multiple stages of backup devices may be employed, and multiple versions of storage objects as of different points of time may be stored at the various backup stages. For example, a first backup version of a collection of production files may be maintained at a secondary host, and additional backup versions (such as snapshots) may be created periodically at tertiary storage from the secondary host. A given storage object may be restored from any one of the multiple backup versions. For example, if a user inadvertently overwrites a particular document, and snapshots of the document are created once every day and retained for a week, it may be possible to retrieve a version of the document corresponding to any day of the previous week.

Traditionally, the ability to initiate restore operations has often been restricted to backup administrators or other backup experts who are familiar with details of backup storage organization, and end users have usually not been allowed to restore storage objects. Requiring administrators to support restore operations needed as a result of common errors (such as inadvertent deletions of user files) may lead to unnecessary delays and reduced productivity, especially where restorations may at least in principle be initiated by end users— e.g., where at least some backups are made to disk-based storage devices that do not require operators to load tapes for restore operations. However, end users may typically be unaware of, and uninterested in, the details of backup environments such as the physical locations where various versions of a file are stored. Instead, end users may be more familiar with the actions that they may have performed on the storage objects—e.g., a particular user may be aware that he or she updated a document related to a specific project yesterday. Techniques and interfaces that efficiently allow end users to select restorable versions of storage objects using concepts and categories that are meaningful and familiar to end users, without requiring the end users to understand details of backup implementations, may help reduce administrative costs and improve overall organizational efficiency.

SUMMARY

Various embodiments of systems and methods for using recent activity information to select backup versions of storage objects for restoration are disclosed. According to one embodiment, a system comprises a processor and memory coupled to the processor, where the memory stores program instructions computer-executable by the processor to implement a backup manager. The backup manager may be configured to maintain one or more backup versions of a plurality of storage objects, and to maintain a plurality of access history records, where each access history record is associated with a particular backup version. Each access history record may include information indicative of an access to the corresponding storage object by a user. For example, in one embodiment a particular backup version may include the effects of one or more changes made to the corresponding storage object since a previous backup version was generated, and the access history record may indicate when the latest of those one or more changes was made by a user. The backup manager may be configured to select a particular backup version as a restoration candidate (i.e., a backup version from which the primary storage object may be restored to a desired restoration target) using at least the contents of the access history record associated with the backup version. In some implementations, for example, a user may use an interface provided by the backup manager to generate a selection request for restoration candidates, where the selection request specifies an access time range (e.g., "select files that were modified yesterday") but does not include a name or a storage path to a desired restoration candidate, and the backup manager may be configured to use the access history records to respond to the request. By allowing end users to identify restoration candidates using familiar terms and concepts, without requiring the end users to understand details of backup implementations and/or to interact with backup administrators, the backup manager may help to reduce overhead associated with restoration.

The access history records associated with backup versions may include a variety of different types of information in different embodiments. In one embodiment, for example, an access history record may include a last modification time, indicating the time at which the last modification (e.g., addition of new data, change to existing data, and/or deletion of existing data) was made to the storage object, among the modifications included in the backup version. In another embodiment, an identification of the specific user that performed the last modification may also be included within the access history records. A specification of the changes made to the storage object (e.g., "before/after" versions of a portion of a text storage object) may also be included in, or pointed to via pointers included in, an access history record in some embodiments.

In one embodiment, the backup manager may be configured to provide an interface (such as a web-based interface or a custom graphical user interface) to generate a request to identify restoration candidates, where the interface includes a selection mechanism to select a particular group of backup versions from among a plurality of named groups (e.g., "Today's Files", "Yesterday's Files", etc.). The names of the groups may be indicative of corresponding modification time periods. In response to receiving a request via such an interface, the backup manager may be configured to use the modification time period specified in the request to select one or more restoration candidates based on the contents of the associated access history records.

In some embodiments, in response to a request from a particular end user who may not have administrative privileges, the backup manager may be configured to select restoration candidates from a limited set of backup versions, e.g., from among backup versions that correspond to storage objects that the user is authorized to access. In one embodiment, restoration candidates may be selected from among those backup versions that correspond to storage objects that the requesting user modified.

Figure 1:
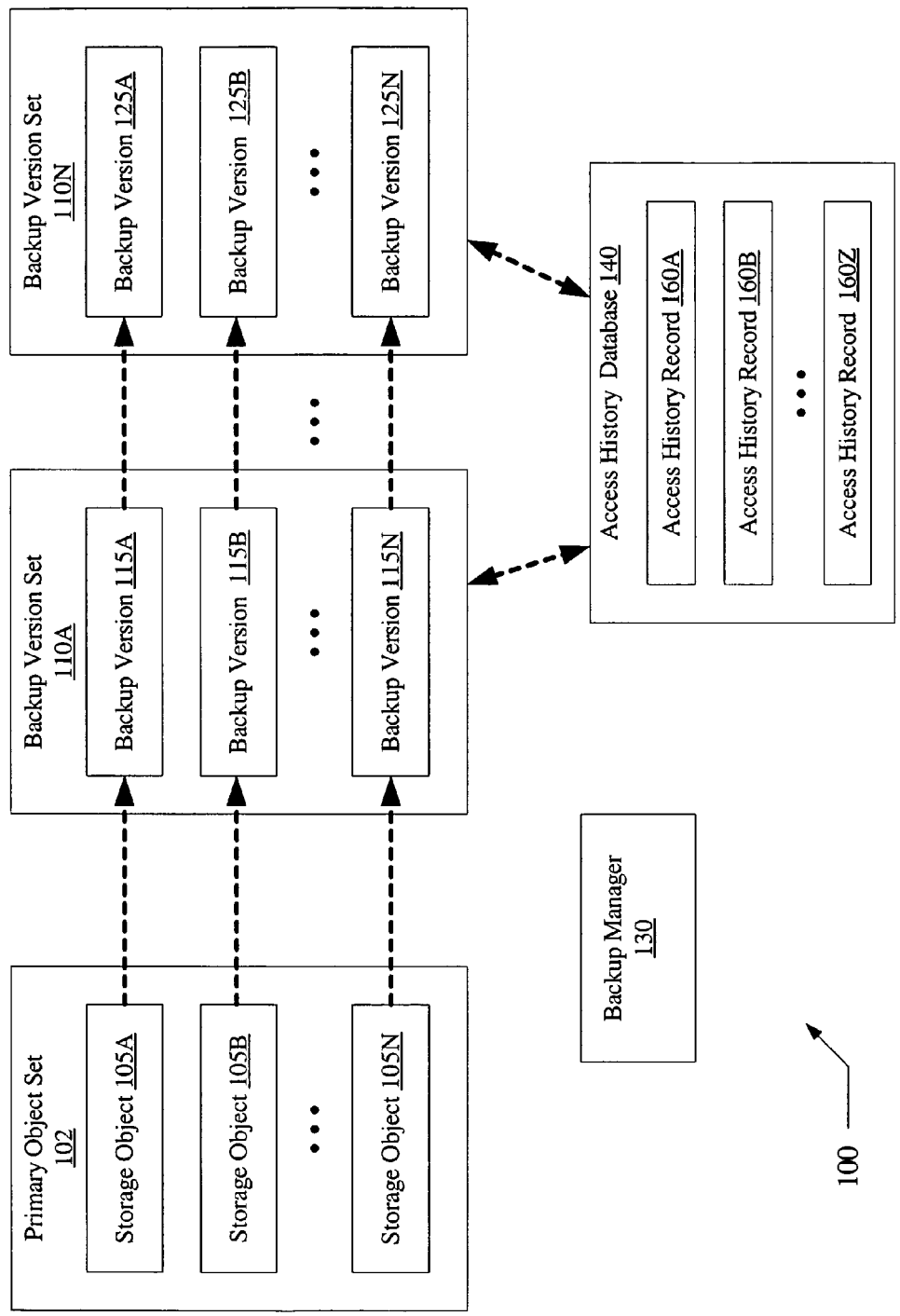
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 includes a primary object set 102 including a plurality of storage objects 105 (i.e., storage objects 105A, 105B, . . . 105N) and a backup manager 130. Backup manager 130 may be configured to maintain one or more backup versions of storage objects 105, such as backup version sets 110A-110N. Primary object set 102 may be resident at one or more primary hosts, and backup version sets 110 may be stored at secondary and/or tertiary servers in some embodiments. Each backup version set 110 (e.g., backup version set 110A or 110N) may include respective backup versions of storage objects 105. For example, backup version set 110A includes backup version 115A corresponding to storage object 105, backup version 115B corresponding to storage object 105B, etc., and backup version set 110N includes backup version 125A corresponding to storage object 105A (and/or backup version 115A), backup version 125B corresponding to storage object 105B, etc. In some embodiments, backup versions within a backup particular backup version set 110 may be derived directly from primary object set 102, while in other embodiments, at least some backup versions within at least one backup version set may be derived or generated from another backup version set.

Backup manager 130 may be configured to maintain a plurality of access history records 160 (e.g., 160A-160Z) included within an access history database 140. In some embodiments, the backup manager 130 may utilize an external entity such as a search/indexing engine to maintain the access history database, e.g., as part of a more general search database, while in other embodiments the backup manager 130 may be configured to maintain the access history database 140 independently of other databases or external entities. Each access history record 160 may correspond to a specific backup version of a storage object: for example, record 160A may correspond to backup version 115A, record 160B may correspond to backup version 125A, etc. In addition, each access history record may include information indicative of an access to a corresponding storage object 105 by a user, such as, for example, the time at which the object was last modified by a user, an identification of the user, etc. In some embodiments, access history records may also be maintained for storage objects that have been deleted (at least for some period of time following the corresponding deletions)—e.g., an access history record 160 corresponding to a deleted storage object 105 may include an indication of when the deletion took place. Further details regarding the contents of access history records in different embodiments are provided below in conjunction with the description of FIG. 2a-FIG. 2e. Backup manager 130 may also be configured to select a particular backup version (e.g., a backup version 115 or a backup version 125) as a candidate for restoration, using at least the corresponding access history record in making the selection. As also described below in further detail, additional criteria, such as the requesting user's authorization level or credentials, may also be used in making the selection in some embodiments.

In one embodiment, backup manager 130 may be configured to provide an interface that allows users to select backup versions 115 or 125 for restoration based on the recency of updates to the corresponding storage objects 105, e.g., by classifying backup versions into categories such as "Today's Files" (files that were modified and/or backed up today), "Yesterday's Files" (files that were modified and/or backed up the previous day), etc. In one such embodiment, a user may be able to request backup manager to select a particular backup version 115 or 125 as a restoration source based on when the corresponding storage object was accessed, without needing to know or specify the storage location of the backup version, when the backup version was generated, and/or any other details about the backup services provided by backup manager 130. In one implementation, the user may not even need to know the name of the storage object to be restored, and may select a backup version for restoration simply by specifying a time range during which the storage object was modified. Using such techniques, the task of deciding which specific backup version is to be restored may be considerably simplified for end users, and assistance from backup administrators may not be needed for many common restoration tasks, thus potentially reducing the overall costs associated with managing enterprise data. After a particular backup version is selected for restoration (e.g., by clicking on a "Restore" button associated with the particular backup version within a graphical user interface or GUI), the backup manager 130 may be configured to retrieve the contents of the particular backup version and restore the corresponding storage object 105 at a designated restoration target.

In some embodiments, access history records 160 may be generated for only a subset of the backup version sets 110—e.g., in one such embodiment, access history records may only be created for backup version set 110N. Indexes to the access history records 160 may also be maintained in some implementations, for example to speed up responses to search requests that include search criteria based on access history. In some embodiments, the generation of backup version sets 110 and the access history database 140 may be asynchronous and/or independent of each other—for example, backup version set 110A may be generated via a periodic or continuous replication process, backup version set 110N may be generated via an independently-scheduled sequence of snapshot operations performed on backup version set 110A, and backup manager 130 may be configured to initiate generation of access history records 160 asynchronously with respect to the backup processes used to generate the backup version sets. As noted earlier, backup versions and associated access history records 160 may also be maintained for deleted storage objects as well. In some embodiments, at least a subset of the backup versions and/or access history records corresponding to deleted primary storage objects 105 may be purged from time to time.

The term "storage object", as used herein, may refer to any collection of one or more data items for which backup and restore functionality may be desired. A variety of different types of storage objects 105 may be included within primary object set 102 in various embodiments. For example, storage objects 105 may include user-created files, such as files created on individual user workstations using productivity applications such as word processors or spreadsheets, files stored on shared file systems or repositories (such as, for example, source code files or object code files in a software development environment), electronic mail messages or message aggregations such as user mailboxes, database tables or indexes associated with a database management system, simulation results, etc. Any of a number of different backup techniques may be used to create backup version sets 110 in various embodiments. For example, a replication technique, such as asynchronous replication, synchronous replication, periodic replication or real-time replication may be used to generate backup version set 110A from primary object set 102 in one embodiment, while a snapshot or frozen image technique may be used to generate a backup version set 110B (not shown in FIG. 1) from backup version set 110A. The snapshot may include point-in-time copies or versions of various storage objects 105. In one embodiment, primary object set 102 may be stored at a first computer host, and backup version sets 110 may be stored at other computer hosts linked to the first host via a network. In another embodiment, primary object set 102 and one or more backup version sets 110 may be stored within the same host. Various components of backup manager 130 (e.g., a replicator, a snapshot generator, or a restoration engine) may be incorporated within the first host as well as within other hosts, as described below in further detail.

Figure 2A:
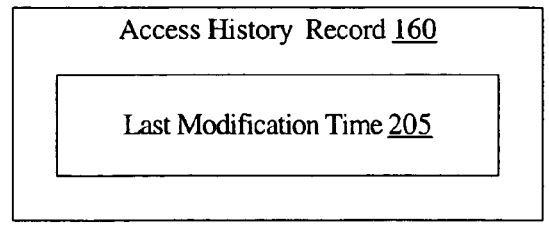
FIGS. 2a-2e are blocks diagram illustrating constituent elements of an access history record, according to various embodiments.

FIG. 2a-FIG. 2e are block diagrams illustrating exemplary constituent elements of access history records 160 in respective embodiments. As shown in FIG. 2a, in one embodiment, an access history record 160 may comprise a last modification time 205 of the corresponding storage object 105. The last modification time 205 included within an access history record 160 associated with a particular backup version 115 or 125 may indicate the time at which the most recent changes (e.g., addition of new data, update of existing data, or deletion of existing data), among the set of changes reflected in the backup version, were made to the corresponding primary storage object 105. For example, if a particular storage object 105A was modified at 11:05 AM on Jul. 1, 2005, again modified at 11:15 AM on Jul. 1, 2005, and then again modified at 11:30 AM on Jul. 1, 2005, and a first backup version 115A of storage object 105A was created at 11:20 AM on Jul. 1, 2005, then, in one embodiment, the last modification time 205 recorded in an access history record 160 for the first backup version 115A would be 11:15 AM on Jul. 1, 2005. If a second backup version 115K of the storage object 105A were created at 11:35 AM on Jul. 1, 2005, and no modifications were made to the storage object between 11:30 AM and 11:35 AM, then an access history record for the second backup version may include 11:30 AM on July 1 as the last modification time 205 in the embodiment depicted in FIG. 1. In addition, if a backup version 125B were created from the backup version 115A in this example (e.g., via a snapshot), the last modification time 205 in the access history record 160 associated with backup version 125B may also be set to 11:15 AM on Jul. 1, 2005. Thus, in the embodiment illustrated in FIG. 2a, the last modification time information 205 within an access history record 160 may be indicative of the time at which latest set of changes that may be restored or recovered using the corresponding backup version 115 or 125 were made. In some embodiments, e.g., where continuous replication or real-time replication is used to generate backup versions as soon as changes are made to primary storage objects 105, the creation times of the backup versions may be used as default values of last modification times 205.

Figure 2B:
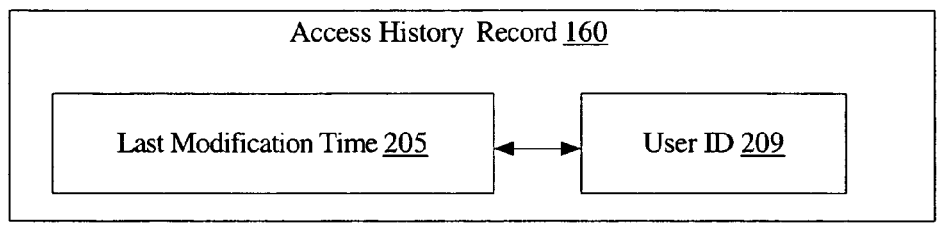

FIG. 2b illustrates an access history record 160 that includes a user ID (identifier) 209, identifying the particular user that modified the corresponding storage object 105 at a corresponding last modification time 205, according to one embodiment. User ID field 209 may be utilized by backup manager 130 in a variety of ways in different embodiments. For example, in some embodiments, a particular user may only be allowed to restore storage objects 105 that were last modified by that particular user, and backup manager 130 may be configured to use the user ID fields 209 of the access history records 160 to enforce this restriction. In other embodiments, a particular user may be permitted to restore storage objects that were last modified by any of a specified set of users, and the user ID fields 209 may similarly be used to enforce such a restriction. The contents of user ID field 209 may be stored in various formats in different embodiments, e.g., as string versions of user login identifiers, as LDAP (Lightweight Directory Access Protocol) user identifiers, as numeric identifiers, as users' full names, etc. An indication of a user's group membership or memberships may also be included within user ID field 209 in some embodiments.

Figure 2C:
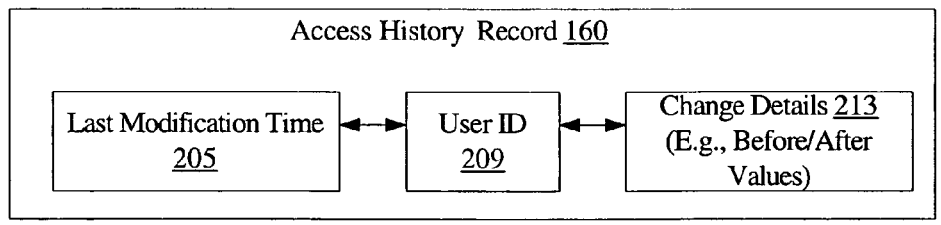

In some embodiments, an indication of the specific changes that were made to storage object 105 may also be stored in access history records 160. For example, in one such embodiment, an access history record may include a change details field 213, along with a last modification time 205 and a user ID 209, as shown in FIG. 2c. In addition to identifying the user that made the last changes reflected in the backup version (via user ID 209), and the time at which the last changes were made (via last modification time 205), in such an embodiment the access history record 160 may use change details field 213 to specify or indicate what the changes consisted of. In some implementations, for example, the change details field may include a "before" version and an "after" version of at least a portion of the contents of the corresponding storage object 105. If the storage object 105 is a text document, the before and after versions may include two different versions of a paragraph that was being edited, for example. In one implementation, the before and after versions may be stored in compressed format. In another implementation, change detail information may be stored in a separate table or database, and access history records 160 may include pointers to the corresponding change detail information entries within the separate table or database. In other implementations, the change details field may indicate a logical operation that was performed during the last modification (e.g., a representation of the following information may be stored: "the entry at column 4, row 5 of spreadsheet S was added to the entry at column 4, row 6, and the result was stored in column 7, row 1"). The implementation of change details field 213 may vary for different types of storage objects 105 and for different applications that may have been used to modify the storage objects 105—for example, modifications to text storage objects 105 using a word processor may be handled using a first type of change details field, while modifications to graphical storage objects or spreadsheet storage objects may be handled using a different type of change details field. In some embodiments, backup manager 130 may be configured to store information in change details fields 213 only for a specific set of storage object types (e.g., only for text files), and may not store change details for other types of storage objects. Change details fields 113 may be used, for example, to allow a user to select a particular backup version 115 or 125 for restoration based on the specific changes to content that were made to the backup version.

Figure 2D:
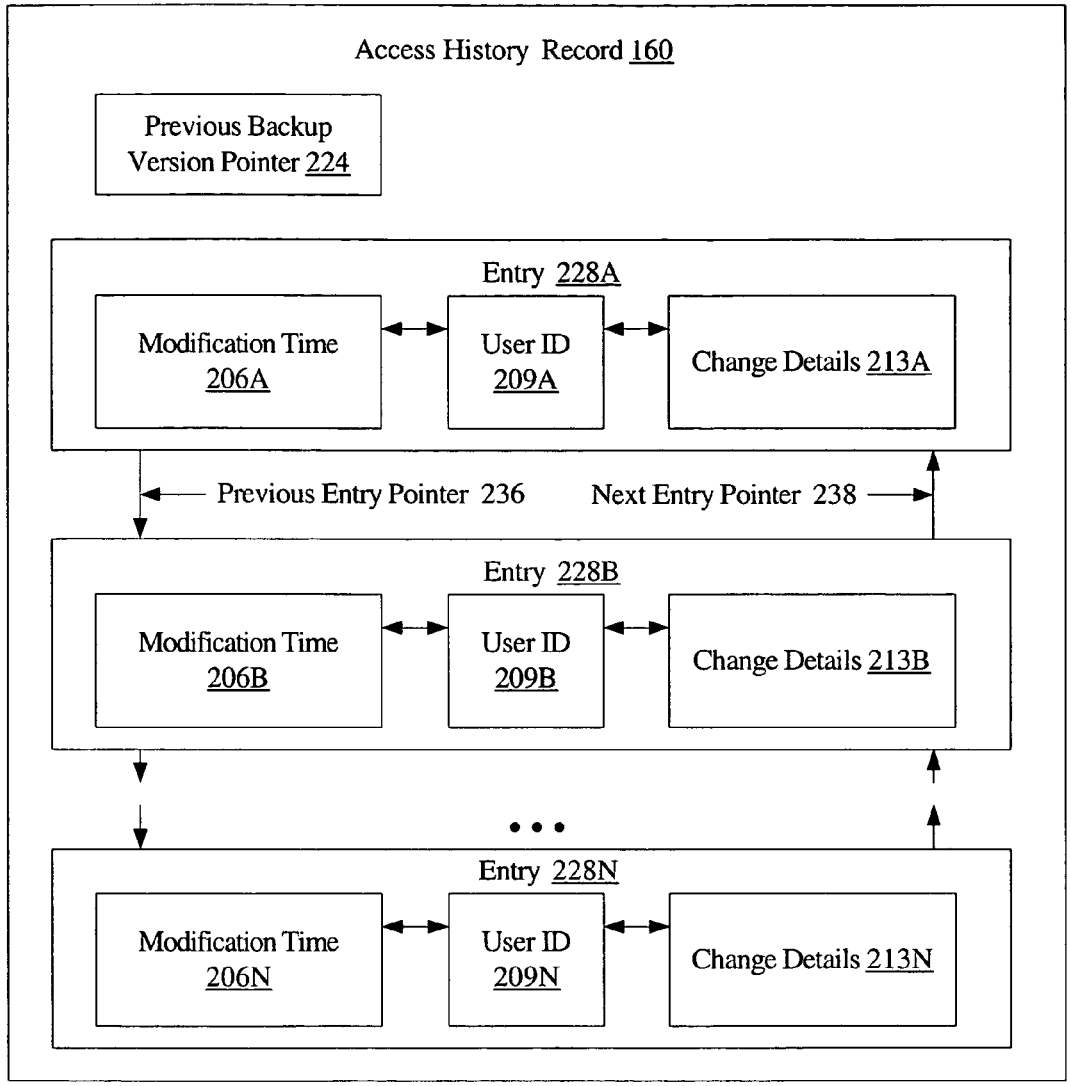

FIG. 2d is a block diagram illustrating an access history record 160 that includes information indicative of more than one modification to a corresponding storage object 105, according to one embodiment. As shown, the access history record 160 may include a plurality of entries 228 (e.g., entry 228A, 228B, ... 228N), each of which includes a respective modification time 206, a user ID field 209 and a change details field 213. The plurality of entries 228 may indicate a set of changes that were made to the corresponding storage object 105 since a previous backup version was generated, and a pointer 224 to the previous backup version may also be included within the access history record 160. The entries 228 may be linked to each other, e.g., using previous entry pointers 236 and next entry pointers 238, to indicate the sequence in which modifications were made to the source storage object 105 in some embodiments. Each entry 228 may indicate the time at which a corresponding modification was made (e.g., via modification time field 206), the user that made the modification (e.g., via user ID field 209), and the specific changes that were made (e.g., via change details field 213) to the storage object 205. Access history records 160 such as those illustrated in FIG. 2d may be used in some embodiments where each backup version reflects a plurality of modifications to the corresponding storage object, but where fine-grained control of restoration operations is desired, e.g., where each change to a storage object may be individually restored.

Figure 2E:
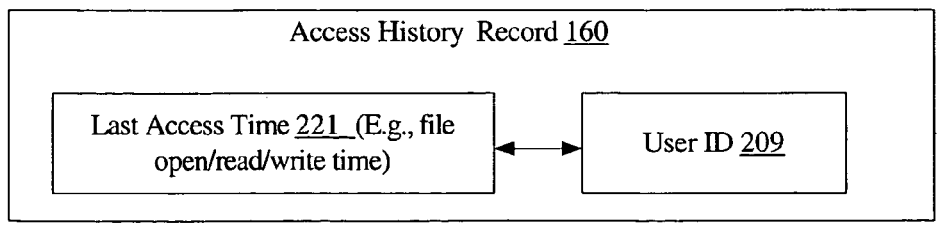

In some embodiments, access history records 160 may include indications of read accesses, in addition to or instead of indications of storage object modifications. FIG. 2e illustrates an access history record 160 that includes a last access time field 221, indicating the last time an access of any kind, such as an open, read, write, or attribute change operation, was performed on a corresponding storage object 105 prior to the generation of the backup version 115 or 125 corresponding to the access history record. Last access time field 221 may also include an indication of the specific type of access or I/O operation that was last performed on the storage object 105 in some embodiments (e.g., whether a read, write, open, attribute change or other operation was last performed on a file storage object 105). In some embodiments, backup manager 130 may be configured to use last access times 221 to select restoration candidates, e.g., in response to user requests indicating when a storage object was last read or opened.

It is noted that in addition to the example organizations of access history records shown in FIGS. 2a-2e, other organizations of access history records may be implemented in various embodiments. For example, in one embodiment, a plurality of access time records similar to last access time fields 221 may be stored within a single access history record 160, while in other embodiments, linked entries 228 may include only modification times 206 and user IDs 209, or linked entries 228 may include only modification times 206 and change details fields 213. In one implementation, e.g., where backup versions 115 are generated very frequently or continuously in response to changes made to primary storage objects, the time at which the backup version was created may be used as a default indicator of modification time, instead of storing the precise time at which a change was made to the primary storage object. In such an implementation, user IDs 209 and/or change details 213 may be stored in access history records, e.g., without explicitly storing modification times. In some embodiments, access history records 160 may also include pointers to the storage locations of the corresponding backup versions 115 or 125, so that, for example, backup manager 130 may efficiently access a backup version for restoration using a pointer stored in the access history record. As noted above, in one embodiment, access history records may be maintained within a search database, e.g., each access history record may be maintained as a record within a corresponding search database entry, where the search database entry may include information indicative of the contents of the corresponding storage object, security-related information, etc.

Figure 3:
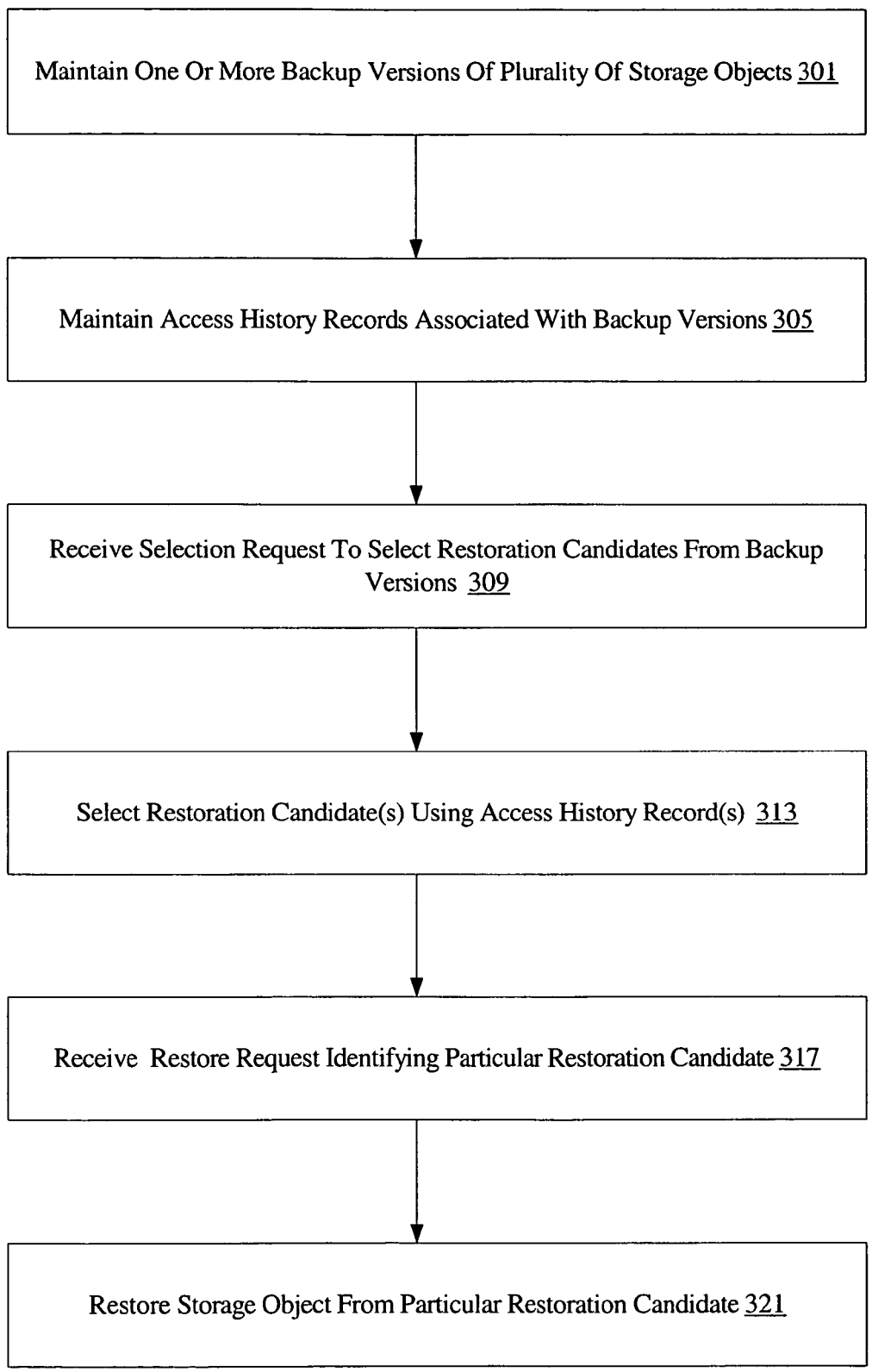
FIG. 3 is a flow diagram illustrating aspects of the operation of a backup manager, according to one embodiment.

FIG. 3 is a flow diagram illustrating aspects of the operation of backup manager 130, according to one embodiment. Backup manager 130 may be configured to maintain one or more backup versions (e.g., backup versions 115 and 125 in backup version sets 110) of a plurality of storage objects 105 (block 301 of FIG. 3), and to maintain access history records 160 associated with the backup versions (block 305). Backup manager 130 may be configured to receive a selection request to select restoration candidates from among the backup versions (block 309), for example via a graphical user interface (GUI), a command-line interface, a web-based restoration interface, etc. The selection request may, in some embodiments, specify search criterion in terms of modification times or access times of the storage objects 105. In some implementations, the search requests may only specify modification or access times or ranges, and may not include the names or storage locations of the storage objects 105 or the backup versions 115 or 125.

In response to the request, backup manager 130 may be configured to use at least the access history records 160 to select a set of one or more restoration candidates (block 313), and may also be configured to display or present the selected set of restoration candidates to the requesting user that generated the selection request. In selecting the restoration candidates, security concerns and access permissions may also be taken into account by backup manager 130 in some embodiments. For example, in some embodiments, in response to a selection request from a particular user who may not have administrative privileges, backup manager 130 may be configured to select from among only those backup versions as restoration candidates that were generated from storage objects 105 that the user is authorized to access (e.g., storage objects 105 to which the user has read or read/write access). In other embodiments, backup manager 130 may be configured to select from among only those backup versions that were generated from storage objects 105 that the requesting user modified, or to select from among only those backup versions that were generated from storage objects 105 that were modified by any user from a specified group of users. In some embodiments, the interface used to generate the selection request may allow a requesting user to specify one or more other desired characteristics or properties of the restoration candidates in addition to access times or modification times, such as a list of users who may have last modified the corresponding storage objects 105. On receiving or viewing the list of restoration candidates, the requesting user may send a restore request to the backup manager 130, identifying a particular restoration candidate as the one from which restoration is to be performed (block 317). Upon receiving the restore request, backup manager 130 may be configured to restore a storage object 105 from the particular restoration candidate (block 321), e.g., by retrieving the contents of the particular backup version from a backup storage device and copying the contents to a designated restoration target. In embodiments where access history records 160 include pointers to the storage locations of the corresponding backup versions, backup manager 130 may use the pointers to retrieve the contents of the backup versions.

Figure 4:
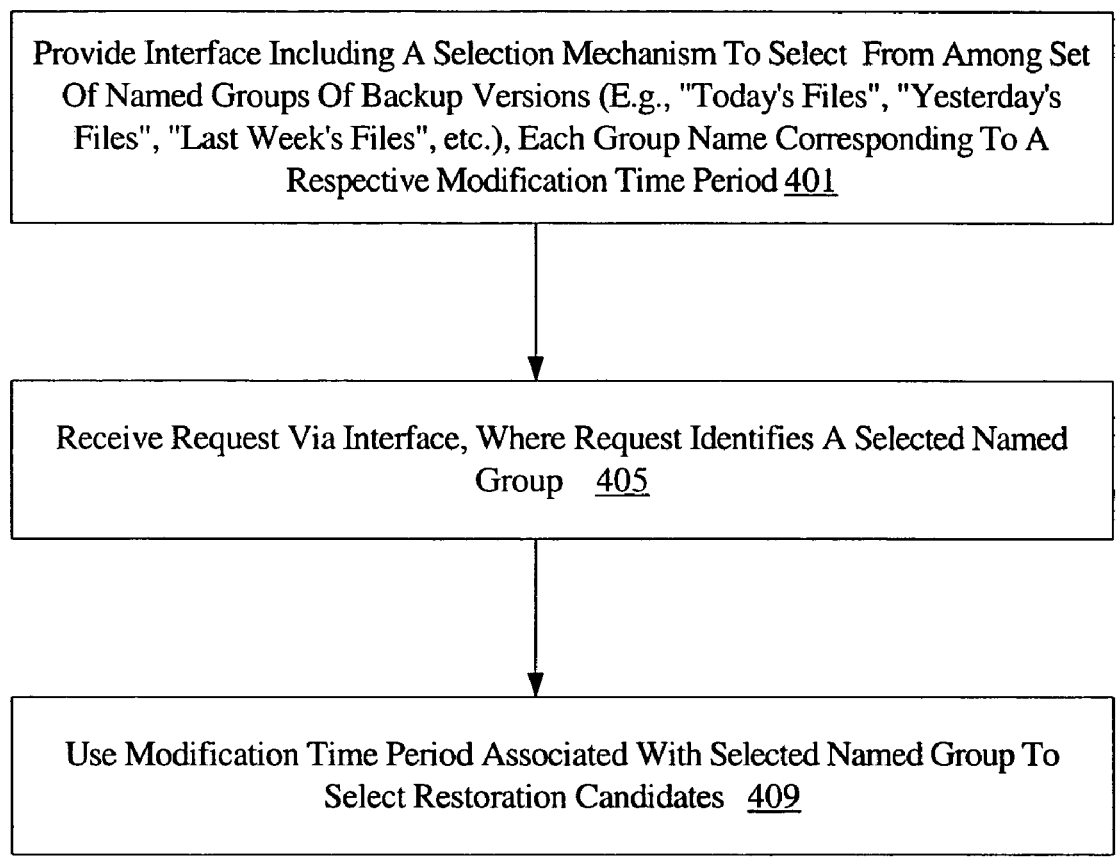
FIG. 4 is a flow diagram illustrating further aspects of the operation of a backup manager, according to one embodiment where a user may generate a request to identify restoration candidates on the basis of recency of activity.

FIG. 4 is a flow diagram illustrating further aspects of the operation of backup manager 130, according to one embodiment where a user may generate a request to identify restoration candidates on the basis of recency of activity at the corresponding storage objects 105. As shown in block 401 of FIG. 4, backup manager 130 may be configured to provide an interface that includes a selection mechanism allowing a user to select a particular named group of backup versions from among a plurality of named groups, such as "Today's Files", "Yesterday's Files", "Last Week's Files", etc., where the names of the groups are indicative of modification time periods. For example, backup versions 115 that include changes made to one or more files since 12:00 AM (midnight) on a particular day may be included within "Today's Files", backup versions that include changes made to files in the previous 24 hours may be included in "Yesterday's Files", etc. Backup manager 130 may be configured to receive a request via the interface (block 405 of FIG. 4), where the request specifies a selected named group. In response to the request, backup manager 130 may be configured to use the modification time period associated with the selected named group in selecting one or more backup versions as restoration candidates (block 409). As described earlier, in some embodiments, security considerations and access permissions of the requesting user may be used to further limit the set of restoration candidates selected. In one embodiment, backup manager 130 may be configured to pre-populate the list of backup versions corresponding to at least one named group for at least some users; e.g., backup manager 130 may be configured to generate a list of "Yesterday's Files" for one or more selected users each day at 12:05 AM. The specific pre-populated groups, and the users for whom the named groups are pre-populated, may be selected on the basis of observed behavior (e.g., how often various users request restores, and how "old" the restores typically are), on the basis of user authorization levels (e.g., lists may be pre-populated for users with specified privileges or roles), etc. In other embodiments, backup manager 130 may be configured to determine the set of backup versions to be included within a particular selected group only when a user request specifying that group is received.

Figure 5:
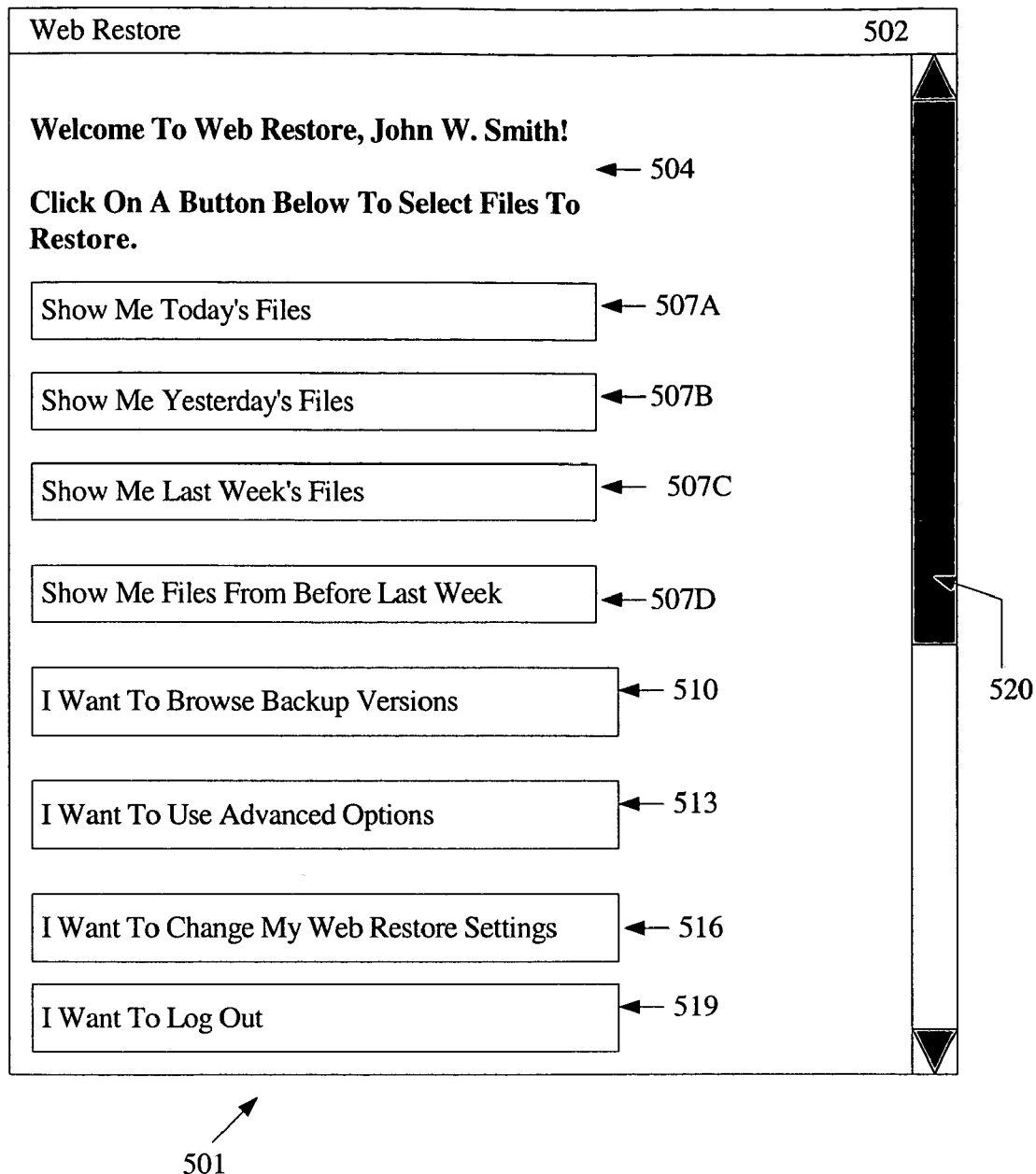
FIG. 5 is a block diagram illustrating a view of one component of an exemplary user interface that may be provided by a backup manager, according to one embodiment.

FIG. 5 is a block diagram illustrating a view of one component of an exemplary user interface 501 that may be provided by backup manager 130, according to one embodiment. The interface 501 may be implemented as one or more web pages, e.g., pages accessed through a web browser over an intranet or the Internet using the HyperText Transport Protocol (HTTP) and associated protocols. The particular web page illustrated in FIG. 5 may be displayed by backup manager 130 in response to a login request in some embodiments, where the login request included a user identification (e.g., a user identifier associated with user "John W. Smith") and a password. If backup manager 130 successfully authenticates the user and password combination in such embodiments, the web page illustrated in FIG. 5 may be displayed. As shown, the web page, which is titled "Web Restore", includes a plurality of elements, including a welcome region 504, a plurality of buttons 507 (e.g., 507A-507D) allowing a user to select backup versions based on recency of usage, a button 510 allowing a user to initiate browsing of backup versions, etc. The web page may also include a title bar 502 and/or a scroll bar 520 in some embodiments.

As shown, the interface 501 may allow a user to request a display of "Today's Files" (via button 507A), "Yesterday's Files" (via button 507B), "Last Week's Files" (via button 507C), and "Files From Before Last Week" (via button 507D), without, for example, having to specify the names of files to be displayed, the storage locations of the source files or their backup versions, etc. As described above in conjunction with the description of FIG. 4, backup manager 130 may be configured to respond to a request received via the interface 501 to populate and display a list of backup versions 115 and/or 125 as restoration candidates using access history records 160. In some embodiments, the interface may allow a user to browse backup versions (e.g., in response to a request received when the user clicks on button 510), where the browsing interface may arrange the backup versions based on various criteria, such as recency of usage, storage location of the source storage objects 105, etc. In one embodiment, "Advanced Options" button 513 and/or "Change Settings" button 516 may be utilized by a user to specify various preferences, such as additional search criteria (such as a list of users, where backup manager 130 may be configured to select restoration candidates from among backup versions of files modified by any member of the list) for restoration candidates, how the files are to be arranged within the browse interface, various properties of interface 501, etc. The user may log out using logout button 519.

In some embodiments, the list of objects displayed in response to one or more buttons 507 and/or 510 may include current versions of files (i.e., versions that have not yet been backed up). In some implementations, the interface 501 may also support additional features not shown in FIG. 5, such as the ability to compare two different backup versions of a particular file, or may omit some of the features illustrated in FIG. 5. In some embodiments, some or all of the elements of interface 501 displayed in FIG. 5 may be included within a more general interface such as a content-based search interface. An interface providing functionality generally similar to that of interface 501 may be implemented using mechanisms other than buttons (e.g., using drop-down lists) in some embodiments, and/or by rearranging some or all of the elements of FIG. 5 in a different layout. The interface 501 may be implemented as a proprietary or custom graphical user interface, instead of or in addition to being implemented via web-accessible pages, in some embodiments. Command line versions of interface 501 may also be implemented in one embodiment.

In response to a request received via an interface such as interface 501, backup manager 130 may be configured to display various types of information related to selected restoration candidates in different embodiments. For example, in one embodiment, backup manager 130 may simply display a set of icons or names of backup versions of files, which may be arranged in order of modification time of the files. In another embodiment, e.g. where access history records 160 include user IDs 209, backup manager 130 may also be configured to display an identification of a user who last modified the file. In embodiments where access history records 160 include change details fields 213, backup manager 130 may also be configured to display an indication of the changes made to the selected backup versions: e.g., for text files, a highlighted text string indicating a changed portion of the text may be displayed. In some embodiments, any combination of the various constituent elements of access history records shown in FIGS. 2a-2e may be used to select restoration candidates using an interface similar to interface 501—e.g., in addition to or instead of modification times, user IDs, change details etc. may be specified in the selection requests.

Figure 6:
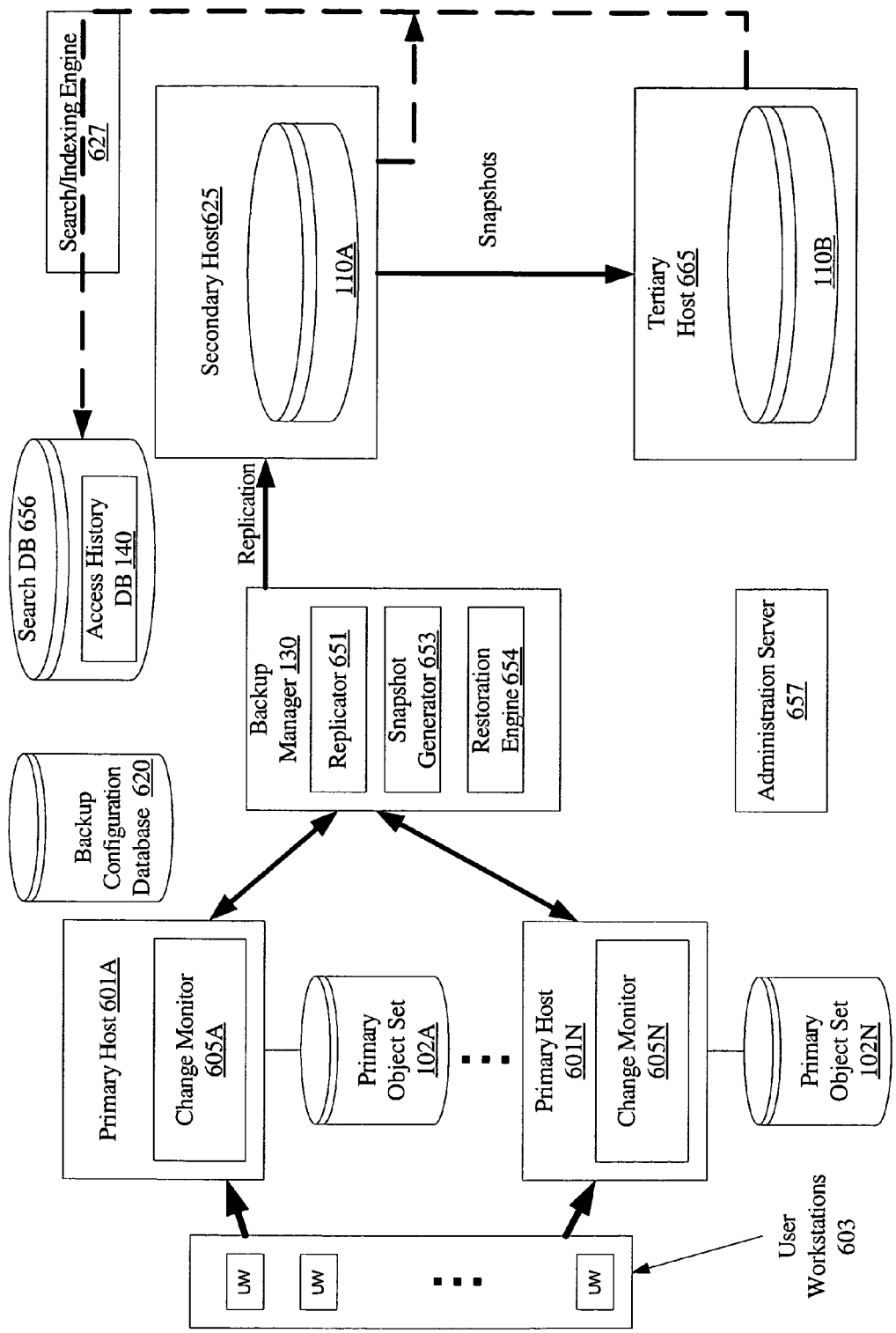
FIG. 6 is a block diagram illustrating an embodiment where updates to storage objects at a plurality of primary hosts may be detected as they occur, and where the detected updates may be replicated to a secondary host.

FIG. 6 is a block diagram illustrating an embodiment where updates to storage objects 105 at a plurality of primary hosts 601 may be detected as they occur, and where the detected updates may be replicated to a secondary host 625. As shown, primary hosts 601A-601N may each include a respective primary object set 102—e.g., primary host 601A may include primary object set 102A, primary host 601N may include primary object set 102N, etc. The primary object sets 102 may represent data of various applications being executed, for example, on behalf of a plurality of users at user workstations (UW) 603. In one embodiment, for example, one of the applications being supported by one or more primary hosts 601 may be an on-line banking service, or an Internet auction service. As input from the user workstations is received, corresponding data transactions may be initiated, which may result in updates to primary storage objects within object sets 102.

In one embodiment, one or more of the primary hosts 601 may include respective change monitors 605, such as change monitor 605A at primary host 601A, that may be configured to monitor a specified set of storage objects of a corresponding primary object set 102 for changes. When changes such as object creations, deletions or modifications are detected, the change monitor 605 may be configured to inform the backup manager 130 (e.g., via a journaling mechanism), and a replicator 651 within the backup manager may be configured to replicate the changes at the secondary host 625. In some implementations, replicator 651 may be configurable to perform replication operations in either direction, as desired—e.g., from primary hosts to secondary hosts, or from secondary hosts to primary hosts. In one specific embodiment, a change monitor 605 may be configured to detect a variety of I/O operations (e.g., operations to read, write, or modify attributes such as security or ownership attributes of files) performed on the set of primary storage objects, and to notify the backup manager 130 of the I/O operation detected. Replicator 651 may be configured to then replicate the I/O operation at one or more backup version sets 110A at the secondary host 625. In this way, changes being made at primary hosts 601 may be very quickly reflected at the secondary host 625—e.g., the state of the backed up versions of primary storage objects at secondary host 625 may track the state of the primary object sets 102 to within a few milliseconds in some implementations. Such a replication process, in which changes being made to the primary storage objects are detected and replicated in real time may be termed "continuous replication" or "real-time replication", and the backup manager 130 may be termed a "continuous protection server" in embodiments supporting continuous replication.

It is noted that in some embodiments, periodic replication rather than continuous replication may be employed; for example, changes made to primary storage objects may be accumulated and replicated in batches, e.g., once every five minutes. Change monitors 605 may be implemented via file system filter drivers in some embodiments, which may be configured to intercept I/O operations as they are executed at the primary hosts 601. In one embodiment, change monitors 605 may be configured to periodically check for changes to storage objects, instead of continuously monitoring for changes. In another embodiment, the replication process may include a synchronization of a primary object set 102 (e.g., a file system) with a replica 110A at secondary host 625, with the additional capability of monitoring and replicating changes that occur at the source data set after the synchronization begins—that is, both synchronization and continuous replication may be performed by backup manager 130. In some embodiments, backup and restoration operations may be managed in transactional units called jobs.

In addition to supporting continuous and/or periodic replication as described above, in some embodiments backup manager 130 may also include a snapshot generator 653, configured to create snapshots or point-in-time versions of desired subsets of the replicated data. For example, in one embodiment, snapshot generator 653 may be configured to create new images of specified sets of primary storage objects from backup version set 110A once every hour (or at any specified frequency), and to store the images within backup version set 110B at tertiary host 665. Thus, secondary host 625 may serve as a staging area for backed up data between the primary hosts 601 and tertiary hosts 665. In the embodiment shown in FIG. 6, access history database 140 may be included within search database 656 (which may, for example, include indexes to the contents of backup version sets 110). Search database 656 and/or access history database 140 may be generated by search/indexing engine 627 on behalf of backup manager 130 in one embodiment. As noted earlier, backup manager 130 may be configured to generate access history database 140 and/or search database 656 in some embodiments, instead of relying on an external search engine. Access history database 140 may be maintained separately from search database 656 in some embodiments. In one embodiment, multiple access history databases 140 may be employed, e.g., one access history database 140 corresponding to each backup version set 110. In one implementation, the specific set of access history databases 140 and/or search databases 656 that are searched in response to a user's search request may be configurable: e.g., for a first user, a first set of databases may be searched, and for a second user, a second set of databases may be searched. Such differential search capabilities may be used, for example, in embodiments where search and restore operations are billable, and the billing rates for users may vary with the set of backup versions that the users are allowed to access. In some embodiments, tape devices or optical storage devices such as various types of jukeboxes may be used for tertiary storage, while in other embodiments, the tertiary storage devices may include disks, disk arrays and the like. Snapshot functionality provided by an operating system in use at the secondary host 625 may be used by backup manager 130, instead of or in addition to snapshot generator 653, in some embodiments.

Backup manager 130 may include a restoration engine 654 in some embodiments, which may be configured to implement restoration operations from secondary host 625 or from tertiary host 665. In such an embodiment, restoration engine 654 may provide the restoration selection interface 501 described above. Configuration information for backup operations, for example including locations of various versions of backed up objects, may be stored in backup configuration database 620 in one embodiment. In another embodiment, an administration server 657 may provide an interface such as an administrative console to configure and manage backup server 130 and its components, such as replicator 651 and snapshot generator 653, as well as search/indexing engine 627. In one embodiment, in addition to backing up primary hosts 601, backup manager 130 may also be configured to back up data of one or more user workstations 603. In some implementations, any combination of replicator 651, snapshot generator 653 and restoration engine 654 may be implemented as independent modules or programs that may be invoked by backup manager 130 as needed. The processes of replication and snapshot generation may be performed independently of each other, or asynchronously with respect to each other, in some embodiments. Snapshots may be generated using any of a variety of specific techniques by snapshot generator 653, e.g., using operating system-provided snapshot functionality, volume mirroring, space efficient snapshot techniques, or custom hardware snapshot techniques.

Figure 7:
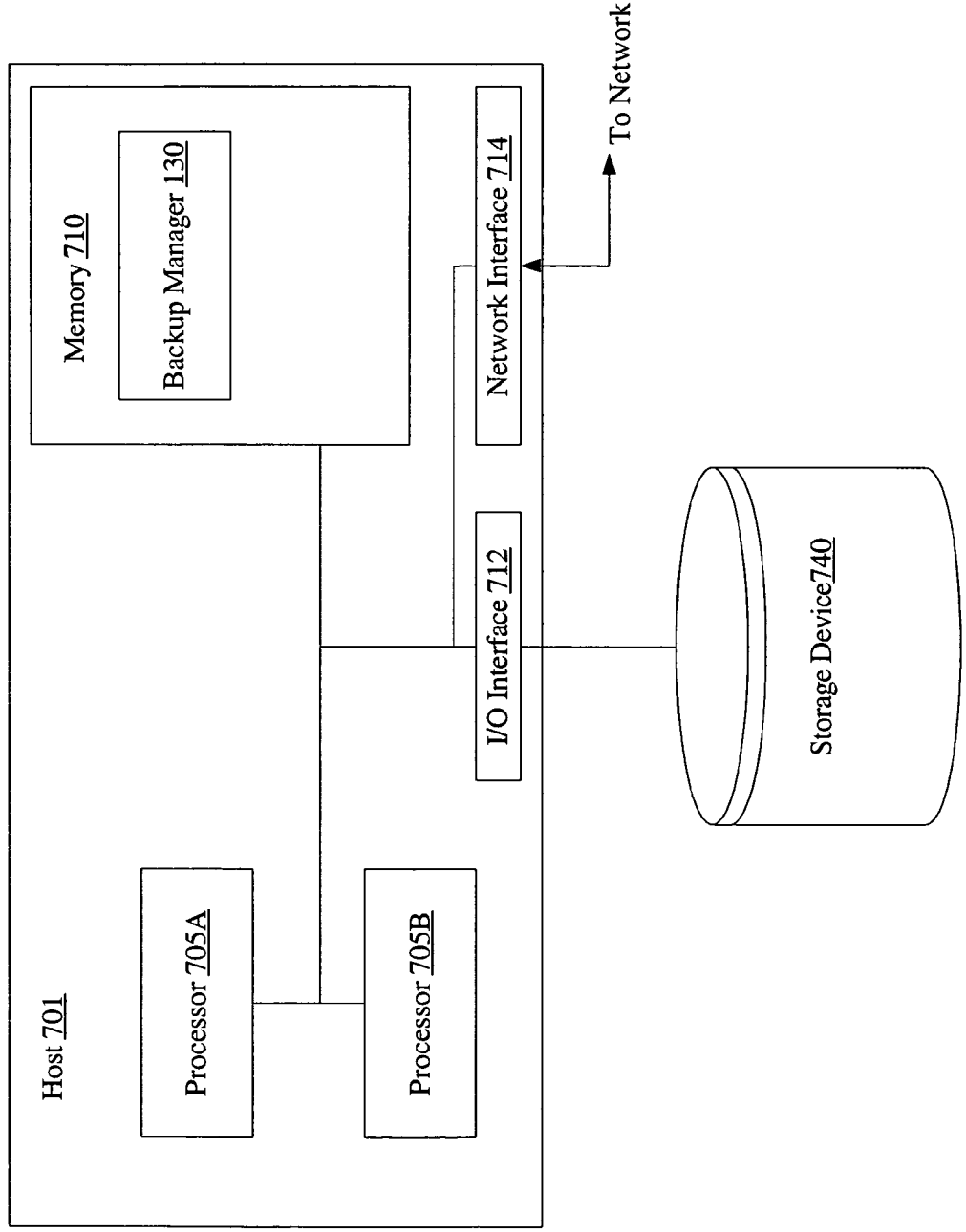
FIG. 7 is a block diagram illustrating constituent elements of a computer host, according to one embodiment.

In various embodiments, at least a portion of backup manager 130 may be executed at primary, secondary or tertiary hosts. FIG. 7 is a block diagram of a computer host 701 that may be deployed as needed as a primary host 601, a secondary host 625, or a tertiary host 665, according to one embodiment. As shown, host 701 may include one or more processors 705, such as processors 705A and 705B. In various embodiments, processors 705 may be implemented using any desired architecture or chip set, such as the SPARC™ architecture from Sun Microsystems or the x86-compatible architectures from Intel Corporation, Advanced Micro Devices, etc. Program instructions that may be executable to implement part or all of the functionality of backup manager 130 may be partly or fully resident within a memory 710 at a given point in time, and may also be stored on a storage device 740. Memory 710 may be implemented using any appropriate computer readable medium such as any of various types of RAM (e.g., DRAM, SDRAM, RDRAM, SRAM, etc.). In addition to processors 705 and memory 710, host 701 may also include one or more I/O interfaces 712 providing access to storage devices 740, one or more network interfaces 714 providing access to a network, interfaces to display devices (not shown), and the like. Any of a variety of storage devices 740 may be used to store the instructions as well as data for backup manager 130 and/or the contents of primary storage objects 105 and backup version sets 110 in different embodiments, include any desired type of persistent and/or volatile storage devices, such as individual disks, disk arrays, tape devices, optical devices such as CD-ROMs, CD-RW drives, DVD-ROMs, DVD-RW drives, flash memory devices, various types of RAM and the like. One or more storage devices 740 may be directly coupled to host 701 in some embodiments (e.g., using the Small Computer Systems Interface (SCSI) protocol), or may be accessible over any desired storage interconnect such as a fiber channel fabric or storage area network (SAN) in other embodiments.

In addition to backup manager 130, memory 710 and/or storage devices 740 may also store operating systems software and/or software for various applications such as backup configuration database 620, administration server 657, etc. in various embodiments. In some embodiments, backup manager 130 may be included within an operating system, a storage management software product or another software package, while in other embodiments, backup manager 130 may be packaged as a standalone product. In one embodiment, one or more components of backup manager 130 described above, such as replicator 651, snapshot generator 653, and/or restoration manager 654 may be implemented as independent software packages or tools. In some embodiments, part or all of the functionality of backup manager 130 may be implemented via one or more hardware devices (e.g., via one or more Field Programmable Gate Array (FPGA) devices) or in firmware.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
one or more processors; and
memory coupled to the one or more processors, wherein the memory stores program instructions executable by the one or more processors to implement a backup manager configured to:
maintain a plurality of backup versions of each of a plurality of storage objects;
maintain a plurality of access history records, wherein each access history record is associated with a backup version from the plurality of backup versions of a corresponding storage object from the plurality of storage objects, and wherein each access history record includes information indicative of an access by a user that results in a modification to the backup version from the plurality of backup versions of the corresponding storage object from the plurality of storage objects, wherein the information indicative of the access by the user includes a modification time of the associated backup version from the plurality of backup versions;
receive a search request that specifies a particular time range of interest;
in response to receiving the search request that specifies the particular time range of interest, identify at least one access history record from the plurality of access history records, wherein the associated backup version of the identified at least one access history record having the modification time within the particular time range of interest; and
display a listing of the identified at least one access history record as restoration candidates on a user interface.

2. The system as recited in claim 1, wherein the search request does not include a name of the restoration candidates.

3. The system as recited in claim 1, wherein each access history record further includes an identification of the user that performed the access that resulted in the modification to the backup version from the plurality of backup versions of the corresponding storage object, and wherein the search request specifies one or more specific users, and wherein the backup manager is further configured to determine whether the identification of the user that performed the access that resulted in the modification to the backup version from the plurality of backup version for each access history record from the plurality of access history records is among the one or more specific users specified in the search request.

4. The system as recited in claim 3, wherein the backup manager is further configured to receive a restore request initiated by a particular user that identifies any one of the restoration candidates for restoration.

5. The system as recited in claim 4, wherein the backup manager is further configured to restore the identified one of the restoration candidates in response to receiving the restore request initiated by the particular user.

6. The system as recited in claim 5, wherein the particular user does not have administrative privileges, and wherein the backup manager is further configured to validate that the particular user is authorized to access the identified one of the restoration candidates.

7. The system as recited in claim 1, wherein the backup manager is further configured to:
provide a search interface on the user interface to generate the search request to identify the restoration candidates, wherein the search interface includes a selection mechanism to select a particular named group of backup versions from among a plurality of named groups of backup versions, wherein a name of each named group from among the plurality of named groups of backup versions is indicative of a respective modification time period;
receive the search request via the search interface, wherein the search request identifies the particular time range of interest based on the respective modification time period selected by the user from the plurality of named groups of backup versions; and
use at least the identified particular time range of interest to select the restoration candidates for display on the listing.

8. A method, comprising:
using one or more computer systems to perform;
maintaining a plurality of backup versions of each of a plurality of storage objects;
maintaining a plurality of access history records, wherein each access history record is associated with a backup version from the plurality of backup versions of a corresponding storage object from the plurality of storage objects, and wherein each access history record includes information indicative of an access by a user that results in a modification to the backup version from the plurality of backup versions of the corresponding storage object from the plurality of storage objects, wherein the information indicative of the access by the user includes a modification time of the associated backup version from the plurality of backup versions;
receiving a search request that specifies a particular time range of interest;
in response to receiving the search request that specifies the particular time range of interest, identifying at least one access history record from the plurality of access history records where the associated backup version of the identified at least one access history having the modification time within the particular time range of interest; and
displaying a listing of the identified at least one access history record as restoration candidates on a user interface.

9. The method as recited in claim 8, wherein the search request does not include a name of the restoration candidates.

10. The method as recited in claim 8, wherein each access history record further includes an identification of the user that performed the access that resulted in the modification to the backup version from the plurality of backup versions of the corresponding storage object, and wherein the search request specifies one or more specific users, and wherein the method further comprises determining whether the identification of the user that performed the access that resulted in the modification to the backup version from the plurality of backup version for each access history record from the plurality of access history records is among the one or more specific users specified in the search request.

11. The method as recited in claim 10, further comprising receiving a restore request initiated by a particular user that identifies any one of the restoration candidates for restoration.

12. The method as recited in claim 11, further comprising restoring the the identified one of the restoration candidates in response to receiving the restore request initiated by the particular user.

13. The method as recited in claim 8, further comprising:
providing a search interface on the user interface to generate the search request to identify the restoration candidates, wherein the search interface includes a selection mechanism to select a particular named group of backup versions from among a plurality of named groups of backup versions, wherein a name of each named group from among the plurality of named groups of backup versions is indicative of a respective modification time period;
receive the search request via the search interface, wherein the search request identifies the particular time range of interest based on the respective modification time period selected by the user from the plurality of named groups of backup versions; and
using at least the identified particular time range of interest to select the restoration candidates for display on the listing.

14. A computer readable storage medium storing program instructions, wherein the program instructions are executable to:
maintain a plurality of backup versions of each of a plurality of storage objects;
maintain a plurality of access history records, wherein each access history record is associated with a backup version from the plurality of backup versions of a corresponding storage object from the plurality of storage objects, and wherein each access history record includes information indicative of an access by a user that results in a modification to the backup version from the plurality of backup versions of the corresponding storage object from the plurality of storage objects, wherein the information indicative of the access by the user includes a modification time of the associated backup version from the plurality of backup versions;
receive a search request that specifies a particular time range of interest;
in response to receiving the search request that specifies the particular time range of interest, identify at least one access history record from the plurality of access history records, wherein the associated backup version of the identified at least one access history record having the modification time within the particular time range of interest; and
display a listing of the identified at least one access history record as restoration candidates on a user interface.

15. The computer readable storage medium as recited in claim 14, wherein the search request does not include a name of the restoration candidates.

16. The computer readable storage medium as recited in claim 14, wherein each access history record further includes an identification of the user that performed the access that resulted in the modification to the backup version from the plurality of backup versions of the corresponding storage object, and wherein the search request specifies one or more specific users, and wherein the program instructions are further executable to determine whether the identification of the user that performed the access that resulted in the modification to the backup version from the plurality of backup version for each access history record from the plurality of access history records is among the one or more specific users specified in the search request.

17. The computer readable storage medium as recited in claim 16, wherein the program instructions are further executable to receive a restore request initiated by a particular user that identifies any one of the restoration candidates for restoration.

18. The computer readable storage medium as recited in claim 17, wherein the program instructions are further executable to restore the identified one of the restoration candidates in response to receiving the restore request initiated by the particular user.

19. The computer readable storage medium as recited in claim 14, wherein the program instructions are further executable to:
provide a search interface on the user interface to generate the search request to identify the restoration candidates, wherein the search interface includes a selection mechanism to select a particular named group of backup versions from among a plurality of named groups of backup versions, wherein a name of each named group from among the plurality of named groups of backup versions is indicative of a respective modification time period;
receive the search request via the search interface, wherein the search request identifies the particular time range of interest based on the respective modification time period selected by the user from the plurality of named groups of backup versions; and
use at least the identified particular time range of interest to select the restoration candidates for display on the listing.

* * * * *

UNITED STATES PATENT AND TRADEMARK OFFICE
CERTIFICATE OF CORRECTION

PATENT NO. : 7,657,582 B1  
APPLICATION NO. : 11/197694  
DATED : February 2, 2010  
INVENTOR(S) : Cram et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 293 days.

Signed and Sealed this

Thirtieth Day of November, 2010

David J. Kappos  
*Director of the United States Patent and Trademark Office*